United States Patent [19]

Krull et al.

[11] Patent Number: 4,516,153
[45] Date of Patent: May 7, 1985

[54] COMPOSITE VIDEO SIGNAL PROCESSING APPARATUS PROVIDING AMPLITUDE EQUALIZATION

[75] Inventors: Donald K. Krull; Saiprasad V. Naimpally, both of Indianapolis, Ind.

[73] Assignee: RCA Corporation, Princeton, N.J.

[21] Appl. No.: 480,507

[22] Filed: Mar. 30, 1983

[51] Int. Cl.³ .............................................. H04N 9/535
[52] U.S. Cl. ......................................... 358/31; 358/35
[58] Field of Search ....................... 358/35, 31, 37, 38, 358/166

[56] References Cited

U.S. PATENT DOCUMENTS

| 4,158,852 | 6/1979 | Harlan | 358/35 |
| 4,263,612 | 4/1981 | Gibson et al. | 358/31 |
| 4,288,811 | 9/1981 | Naimpally | 358/31 |
| 4,371,891 | 2/1983 | Yost | 358/31 |

OTHER PUBLICATIONS

RCA Television Service Data Pamphlet, 1981, C-3, pp. 38-39.

Primary Examiner—John C. Martin
Assistant Examiner—Michael Dunnam
Attorney, Agent, or Firm—Eugene M. Whitacre; Paul J. Rasmussen; William H. Meagher

[57] ABSTRACT

In a color TV receiver, a composite video signal processing circuit serves to prepare the signal input to a CCD comb filter, and includes a transistor phase splitter with a first load resistor connected to the transistor's collector electrode and a second load resistor connected to the transistor's emitter electrode. A reactance of a first sign couples the collector electrode to an output terminal, while a reactance of the opposite sign couples the emitter electrode to the same output terminal. A capacitor between the transistor's collector and base electrodes provides a negative feedback path for signal components. Parameter values are selected to provide the processing circuit with a peak response at a frequency above the frequency band occupied by the composite video signals. Processing circuit provides a substantially constant group delay for signal frequencies throughout the band, while compensating for decline at high signal frequencies of IF amplifier's amplitude-versus-frequency characteristic.

8 Claims, 5 Drawing Figures

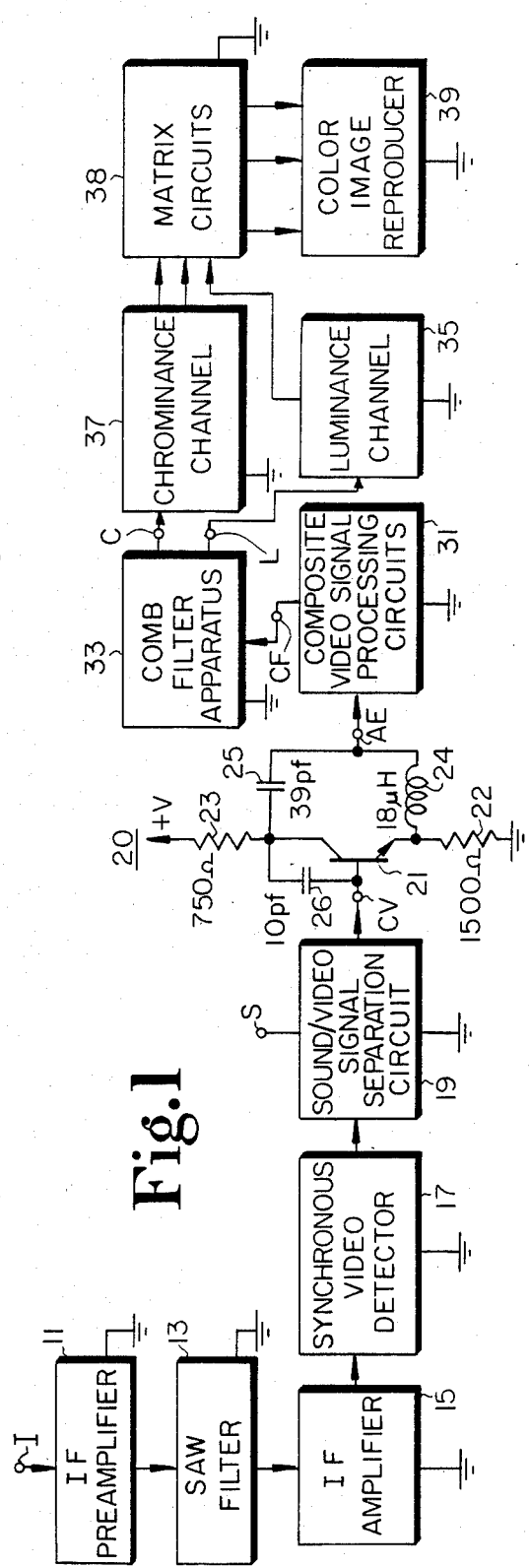
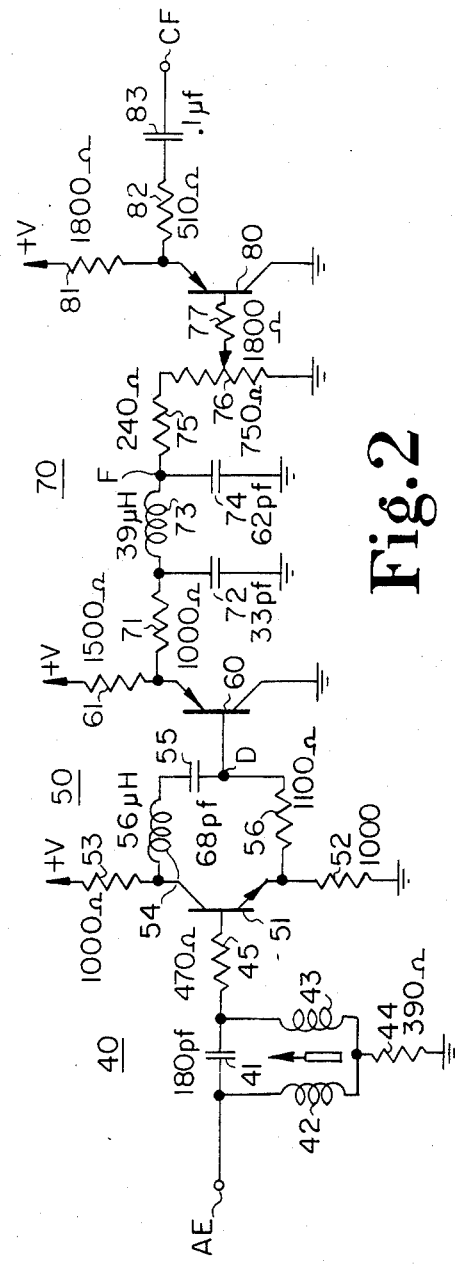
Fig.1
Fig.2

COMPOSITE VIDEO SIGNAL PROCESSING APPARATUS PROVIDING AMPLITUDE EQUALIZATION

The present invention relates generally to apparatus for use in a color television receiver in the processing of a composite video signal inclusive of luminance and chrominance components, and particularly to novel composite video signal processing circuitry introducing desired amplitude equalization effects in an advantageous manner.

Mainly as a result of the characteristic of the IF signal processing circuits of a color television receiver, the composite video signal appearing at the output of a typical receiver's video detector has been subject to an overall amplitude-versus-frequency characteristic which exhibits a roll-off over the upper portion of the signal frequency spectrum, with relative response at the frequency of the color subcarrier (the sidebands of which convey the chrominance information) significantly lower (e.g., down 6 db.) than the response at the low frequency end of the signal spectrum.

The composite video signal output of the color television receiver's video detector has also been typically subject to a non-linear overall delay-versus-frequency characteristic, with the characteristic of the IF signal processing circuits a prime cause thereof. This is usually so, even where the transmitted signal incorporates predistortion of delay (as in transmissions in the United States, in accordance with F.C.C. delay requirements of the form described, for example, in the U.S. Pat. No. 2,791,752—Fredendall).

One prior art approach to compensation for the above-mentioned frequency response roll-off and delay distortion effects employs separate compensation circuits in the respective luminance and chrominance channels of the color television receiver. A luminance channel peaking circuit, which provides adjustable degrees of compensation for effects of the frequency response roll-off, on the luminance component, and also introduces compensation for the effects of the aforementioned delay distortion on the luminance component is described, for example, in U.S. Pat. No. 4,158,852—Harlan. An example of a chroma peaking circuit, which compensates for the effects of the aforementioned frequency response roll-off on the chrominance component, is described in U.S. Pat. No. 4,288,811—Naimpally.

Postponement of roll-off compensation to respective compensating circuits in the separate luminance and chrominance channels provides less than satisfactory results in color television receivers of the type employing CCD comb filter circuitry to effect separation of the luminance and chrominance components of the composite video signal. For proper operation of the CCD comb filter circuits to obtain outputs with optimum signal-to-noise ratio, it is desirable that the composite video input to the CCD comb filter circuits exhibit an amplitude-versus-frequency characteristic in which response amplitudes at the frequency of the color subcarrier and at the low end of the signal frequency spectrum and substantially equal. To achieve such equality, elevation of the relative response at the subcarrier frequency in a composite video signal processing circuit preceding the comb filter is needed.

In the RCA CTC 111 Chassis Series, described in the RCA Television Service Data pamphlet designated 1981 C-3, a composite video signal processing circuit is provided ahead of the CCD comb filter input to achieve the desired elevation of the relative response at the subcarrier frequency. The processing circuit takes the form of a fixed version of the peaking circuit disclosed in the aforementioned Harlan patent, and provides compensation for the delay distortion that is residual in the video detector output. While the effect of the processing circuit on the overall amplitude-versus-frequency characteristic for the composite video signal is introduction of the desired elevation of the response at the subcarrier frequency to substantial equality with the low frequency response, such introduction is accompanied by a relative accentuation of the response for midband frequencies. An undesirable consequence of such midband accentuation is that for certain picture contents (with strong midband components), the CCD circuits may be subject to signal overloads with resultant signal distortions.

Composite video signal processing circuitry constructed in accordance with the principles of the present invention, however, permit achievement of substantial equalization of responses at subcarrier frequency and at the low frequency end of the signal spectrum without introduction of disturbing midband accentuation effects.

In an illustrative embodiment of the present invention, the composite video signal output of a color television receiver's video detector, prior to component separation for application to separate luminance and chrominance channels, is applied to the input of a signal translator which subjects signals applied to its input to: (a) a frequency response characteristic exhibiting a peak response at an out-of-band frequency above the high frequency boundary of the band of frequencies occupied by the composite signal; and (b) a group delay of substantially the same magnitude for frequencies throughout the band. The frequency response characteristic of the signal translator exhibits a response rise over a high frequency segment of the signal band encompassing the color subcarrier frequency. The response rise is substantially complementary to the high frequency response decline introduced by preceding (e.g., IF) circuitry of the receiver.

In an illustrative construction of the signal translator, a phase splitter transistor develops oppositely phased versions of the composite video signal across respective load resistors, connected respectively to the collector and emitter electrodes of the transistor. A first reactance couples signals developed across one of the load resistors to the signal translator's output terminal, while a second reactance, opposite in sign to the first reactance, couples signals developed across the other load resistor to the signal translator's output terminal. Substantial equality between the magnitudes of the impedances exhibited by the respective reactances occurs at a selected out-of-band frequency above the high frequency boundary of the signal band. To avoid instability, a negative feedback path for signals is desirably provided by a capacitor coupled between the collector and base electrodes of the phase splitter transistor.

In an illustrative application of the invention to a color television receiver where the subsequent component separation is effected by comb filter circuitry of the aforementioned CCD type, the output of the amplitude equalizing signal translator is subject to further processing by a separate delay equalizing stage prior to application to the comb filter input.

In the accompanying drawings:

FIG. 1 illustrates, partially schematically and partially by block representation, color television receiver apparatus incorporating an embodiment of the present invention;

FIG. 2 illustrates schematically circuitry for implementing a signal processing function in the apparatus of FIG. 1.

Figure 3A:
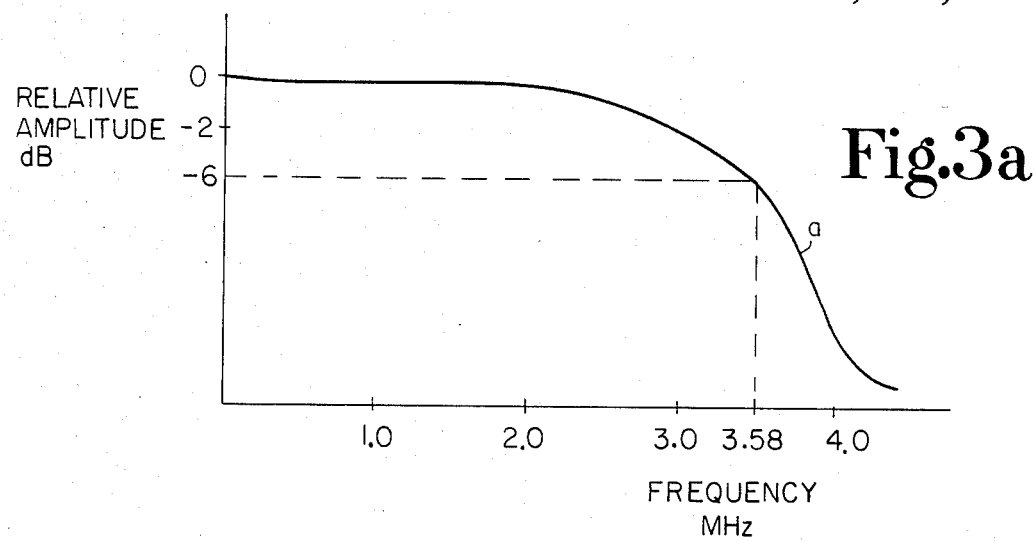
FIGS. 3a, 3b and 3c illustrate graphically characteristics associated with the apparatus of FIG. 1.

In FIG. 1, the intermediate frequency signal output of the tuner of a color television receiver appears at an input terminal I and is supplied to an IF pre-amplifier 11 which drives a SAW filter 13. The preamplified tuner output, as modified by the frequency selective, bandpass filter characteristic of the SAW filter 13, is subject to amplification by an IF amplifier 15. A synchronous video detector 17, responsive to an output of the IF amplifier 15, recovers a composite video signal (and an accompanying intercarrier sound signal) from the amplified IF signal. The output of detector 17 is applied to a sound/video signal separation circuit 19 (illustratively of a form described in U.S. Pat. No. 4,376,953—Naimpally), which develops an intercarrier sound component output at terminal S, and a composite video signal output at terminal CV.

In FIG. 3a, the curve "a" illustrates the overall amplitude-versus-frequency characteristic to which the composite video signal at terminal CV has been subject during its traversal of the receiver processing circuits which precede terminal CV. The response decline over a high frequency segment of the signal band (0–4 MHz.) is apparent in FIG. 3a.

The composite video signal appearing at terminal CV is applied to the input of a signal translating stage 20 which employs an NPN transistor 21 as a phase splitter. Transistor 21 is disposed with its base electrode directly connected to terminal CV, with its collector electrode connected via a first load resistor 23 to the positive terminal (+V) of an operating potential supply, and with its emitter electrode returned to the (grounded) negative terminal of the operating potential supply via a second load resistor 22. A negative feedback path for signals is provided by a capacitor 26, coupled between the collector and base electrodes of transistor 21.

Figure 3B:
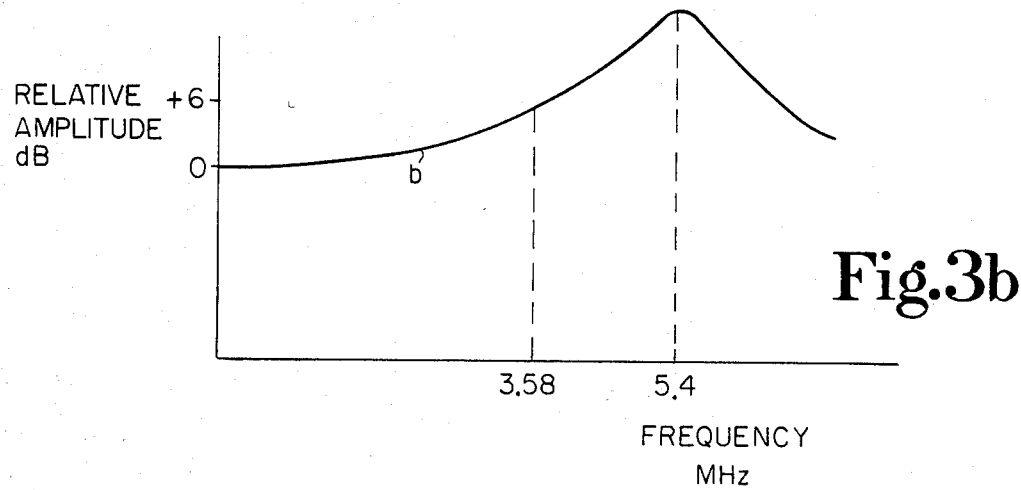

The output terminal AE of the signal translating stage 20 is coupled via a capacitor 25 to the collector electrode of transistor 21, and via an inductor 24 to the emitter electrode of transistor 21. Illustrative values for the circuit components of the signal translating stage 20 appear as legends on the accompanying drawing. With such illustrative component values, an amplitude-versus-frequency characteristic of the form illustrated by curve "b" of FIG. 3b is exhibited by the signal translating stage 20. It will be observed that the response of the signal translating stage 20 peaks at an out-of-band frequency of 5.4 MHz. (in the immediate vicinity of the frequency at which the reactive impedances of capacitor 25 and inductor 24 exhibit the same magnitude), and a response rise over a high frequency segment of the signal band is provided for stage 20 which is substantially complementary to the response decline associated with the high frequency band segment in FIG. 3a.

Figure 3C:
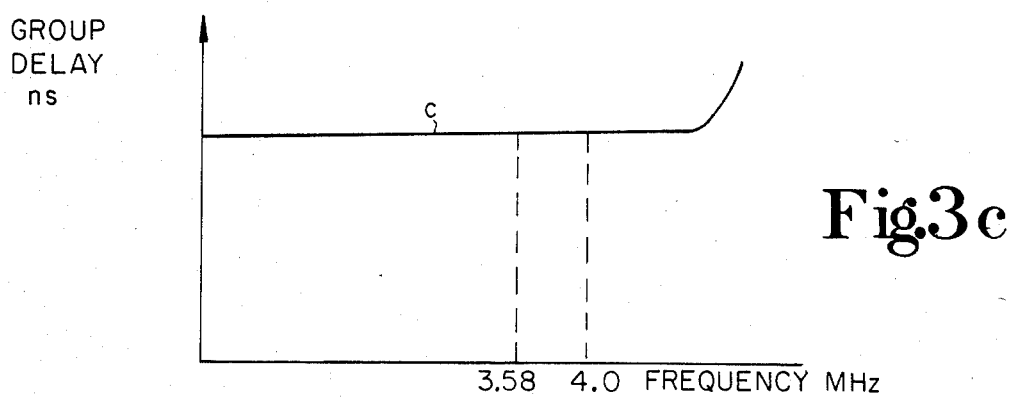

As shown by curve "c" of FIG. 3c, the delay-versus-frequency characteristic of the signal translating stage 20 employing the illustrative component values exhibits a substantial constancy of delay over the signal band. Significant departures from such constancy occur only at out-of-band frequencies (in the frequency response peak vicinity).

The amplitude-equalized composite video signal appearing at terminal AE is coupled via additional composite video signal processing circuits 31 to the input terminal CF of comb filter apparatus 33 (illustratively of the CCD type described in U.S. Pat. No. 4,096,516—Pritchard). The comb filter apparatus 33 develops a first output, comprising the chrominance component of the composite signal to the substantial exclusion of the luminance component thereof, at output terminal C. The comb filter apparatus 33 also develops a second output, comprising the luminance component of the composite signal to the substantial exclusion of the chrominance component thereof, at output terminal L.

The receiver's chrominance channel 37 processes the chrominance component appearing at terminal C, recovering a pair of color-difference signals therefrom for application to matrix circuits 38. A suitable luminance signal input to the matrix circuits 38 is provided by the receiver's luminance channel 35, which processes the luminance component appearing at terminal L. A trio of color signals (R, G and B), developed by matrix circuits 38, are supplied to color image reproducer 39 to control the development of a color image for viewing.

Illustrative circuits for implementing the function of the composite video signal processing circuits 31 of the FIG. 1 receiver arrangement are shown schematically in FIG. 2. In FIG. 2, the amplitude equalizing stage output appearing at terminal AE successively traverses a sound trap circuit 40, a delay compensation stage 50, and a low pass filter 70.

The sound trap circuit 40 of FIG. 2 includes a series capacitor 41, shunted by a pair of series connected inductors 42,43. The junction of the inductors 42,43, which are mutually inductively coupled, is returned to ground via a resistor 44. The trap circuit 40 is tuned, via adjustment of a common core for inductors 42,43, to effect trapping of residual intercarrier sound signal components appearing in the composite signal at terminal AE.

The signal components passed by trap circuit 40 are coupled via resistor 45 to the base electrode of an NPN transistor 51, serving as the active device of the delay compensating stage 50. The collector electrode of transistor 51 is connected to the +V supply terminal via a resistor 53, while the emitter electrode of transistor 51 is returned to ground via resistor 52. The output terminal D of the delay compensating stage 50 is coupled to the collector electrode of transistor 51 via the series combination of capacitor 55 and inductor 54, and is coupled to the emitter electrode of transistor 51 via a resistor 56. The component values for stage 50 are selected so as to obtain a non-linear delay-versus-frequency characteristic for stage 50 which tends to compensate for the residual delay distortion present in the composite signal upon its arrival at terminal AE.

The output of the delay compensating stage 50 is coupled to the input of low pass filter 70 by an emitter-follower formed by PNP transistor 60, disposed with its collector electrode grounded, with its base electrode directly connected to terminal D, and with its emitter electrode connected to the +V supply terminal via a resistor 61. The low pass filter 70 includes the series combination of resistor 71 and inductor 73 connected between the emitter electrode of the emitter-follower transistor 60 and the filter output terminal F. A capacitor 72 is connected between ground and the junction of resistor 71 and inductor 73, and a capacitor 74 is connected between output terminal F and ground. The component values for low pass filter 70 are selected so as to permit passage of signal components with frequencies within the desired signal band, while attenuating out-of-band frequencies to preclude undesired aliasing effects in the sampling operations of the CCD comb filter apparatus 33.

The filtered composite signal appearing at filter output terminal F is applied across the series combination of resistor 75 and the resistive element of potentiometer 76. Adjustment of the tap on potentiometer 76 provides control of the magnitude of composite signal drive for the CCD comb filter apparatus 33 (FIG. 1), the drive being delivered via an output emitter-follower formed by PNP transistor 80. The base electrode of transistor 80 is connected by means of a resistor 77 to the low pass filter output terminal F, while the emitter electrode of transistor is coupled to the comb filter input terminal CF via the series combination of resistor 82 and blocking capacitor 83. The collector electrode of the emitter-follower transistor 80 is grounded, while the emitter electrode thereof is connected via resistor 81 to the +V supply terminal.

In operation of the receiver arrangement of FIG. 1, the amplitude equalization introduced by stage 20 produces a substantially flat overall response for the composite signal input to the comb filter apparatus. The high freqency response depression suffered during IF signal processing is compensated for, without midband disturbance, in the composite video signal processing channel, permitting optimum operation of the subsequent CCD comb filter circuitry. As illustrated by the FIG. 2 circuits, the composite video signal preparation prior to comb filtering may additionally advantagesouly include delay distortion compensation, aliasing component removal, and drive magnitude adjustment in respective stages cascaded with the amplitude equalizing stage.

While advantages have been shown for use of the amplitude equalization approach of the present invention in preparation of comb filter input signals, the approach is advantageous for other uses as well, such as preparation of a composite video signal for delivery to a video output terminal in receivers provided with such an output terminal. In such a use, the amplitude equalizer output may advantageously be coupled to the succeeding circuitry via an isolating emitter-follower stage.

What is claimed is:

1. In a signalling system, wherein (1) a luminance component indicative of the luminance of a color image and occupying a given band of frequencies, and (2) a chrominance component comprising sidebands of a color subcarrier modulated by color difference signals indicative of the coloring of said color image and sharing a portion of said given band adjacent to its high frequency boundary, comprise components of a composite color signal which is subject to processing by signal transfer means presenting an overall frequency response characteristic which exhibits a significant response decline with frequency over a high frequency segment of said band portion inclusive of the frequency of said subcarrier; signal processing apparatus comprising:

signal translating means for subjecting signals applied to its input to: (a) a frequency response characteristic exhibiting a peak response at a out-of-band frequency above said high frequency boundary of said band, and a response rise witth frequency over said high frequency segment of said band portion which is substantially complementary to said response decline, and (b) a group delay of substantially the same magnitude for frequencies throughout said given band;

means for applying the composite color signal output of said signal transfer means to the input of said signal translating means;

luminance component utilization means for controlling the luminance of a reproduction of said color image in accordance with a luminance component derived from the composite color signal output of said signal translating means; and chrominance component utilization means for controlling the coloring of said reproduction of said color image in accordance with a chrominance component derived from the composite color signal output of said signal translating means.

2. Apparatus in accordance with claim 1 wherein said signal translating means includes:

a phase splitter, having an input responsive to said composite color signal output of said signal transfer means and a pair of load resistors, for developing oppositely phased versions of said composite color signals across respective ones of said load resistors;

an output terminal for said signal translating means;

means, including a first reactance, for coupling signals developed across one of said load resistors to said output terminal; and means, including a second reactance, opposite in sign to said first reactance, for coupling signals developed across the other of said load resistors to said output terminal;

wherein the impedance exhibited by said first reactance is substantially equal to the impedance exhibited by said second reactance at an out-of-band frequency in the immediate vicinity of said frequency of peak response.

3. Apparatus in accordance with claim 2 including a comb filter interposed between said signal translating means and each of said ulilization means for deriving the respective luminance and chrominance components utilized by the latter from the composite color signal output of said signal translating means.

4. Apparatus in accordance with claim 2 also including:

an amplifier stage exhibiting a non-linear delay-versus-frequency characteristic;

a low pass filter having a pass band substantially confined to said given band of frequencies;

wherein said amplifier stage and said low pass filter are interposed in cascade between the output of said signal translating means and the inputs of said utilization means.

5. In a color television receiver including an IF amplifier, and a video detector responsive to the output of said IF amplifier for recovering therefrom composite color signals including: (1) a luminance component occupying a given band of frequencies, and (2) a chrominance component, comprising sidebands of a color subcarrier modulated by color difference signals and sharing a portion of said given band adjacent to its high frequency boundary; wherein the parameters of said IF amplifier are such as to effectively subject said composite color signals to a frequency response characteristic which exhibits a significant response decline with frequency over a high frequency segment of said band portion inclusive of the frequency of said subcarrier; signal processing apparatus comprising:

signal translating means, responsive to an output of said video detector, for subjecting said composite color signals to: (a) a frequency response characteristic exhibiting a peak response at an out-of-band frequency above said high frequency boundary of said band, and a response rise with frequency over said high frequency segment of said band portion which is substantially complementary to said response decline, and (b) a group delay of substantially the same magnitude for frequencies throughout said given band;

comb filter means, responsive to the output of said signal translating means, for developing a first output comprising said luminance component to the substantial exclusion of said chrominance component, and a second output comprising said chrominance component to the substantial exclusion of said luminance component;

means, responsive to said second output of said comb filter means, for recovering said color difference signals; and means for utilizing said recovered color difference signals and said luminance component in said first output of said comb filter means to control the reproduction of a color image.

6. Apparatus in accordance with claim 5 wherein said signal translating means comprises:

a transistor having base, emitter and collector electrodes;

means for applying composite color signals recovered by said video detector to said base electrode;

a first load resistor connected to said collector electrode, an inverted version of said composite color signals appearing across said first load resistor;

a second load resistor connected to said emitter electrode, a non-inverted version of said composite color signals appearing across said second load resistor;

an output terminal;

a first reactance connected between said collector electrode and said output terminal;

a second reactance, opposite in sign to said first reactance, connected between said emitter electrode and said output terminal; and a negative feedback path coupled between said collector and base electrodes;

wherein the impedance exhibited by said first reactance is substantially equal to the impedance exhibited by said second reactance at an out-of-band frequency in the immediate vicinity of said frequency of peak response.

7. Apparatus in accordance with claim 6 wherein said first reactance is presented by a capacitor, and said second reactance is presented by an inductor, and wherein said negative feedback path comprises an additional capacitor.

8. Apparatus in accordance with claim 5 also including:

an amplifier stage exhibiting a non-linear delay-versus-frequency characteristic; and a low pass filter having a pass band substantially confined to said given band of frequencies;

wherein said amplifier stage and said low pass filter are interposed in cascade between the output of said signal translating means and the input of said comb filter means.

* * * * *